Patented June 25, 1940

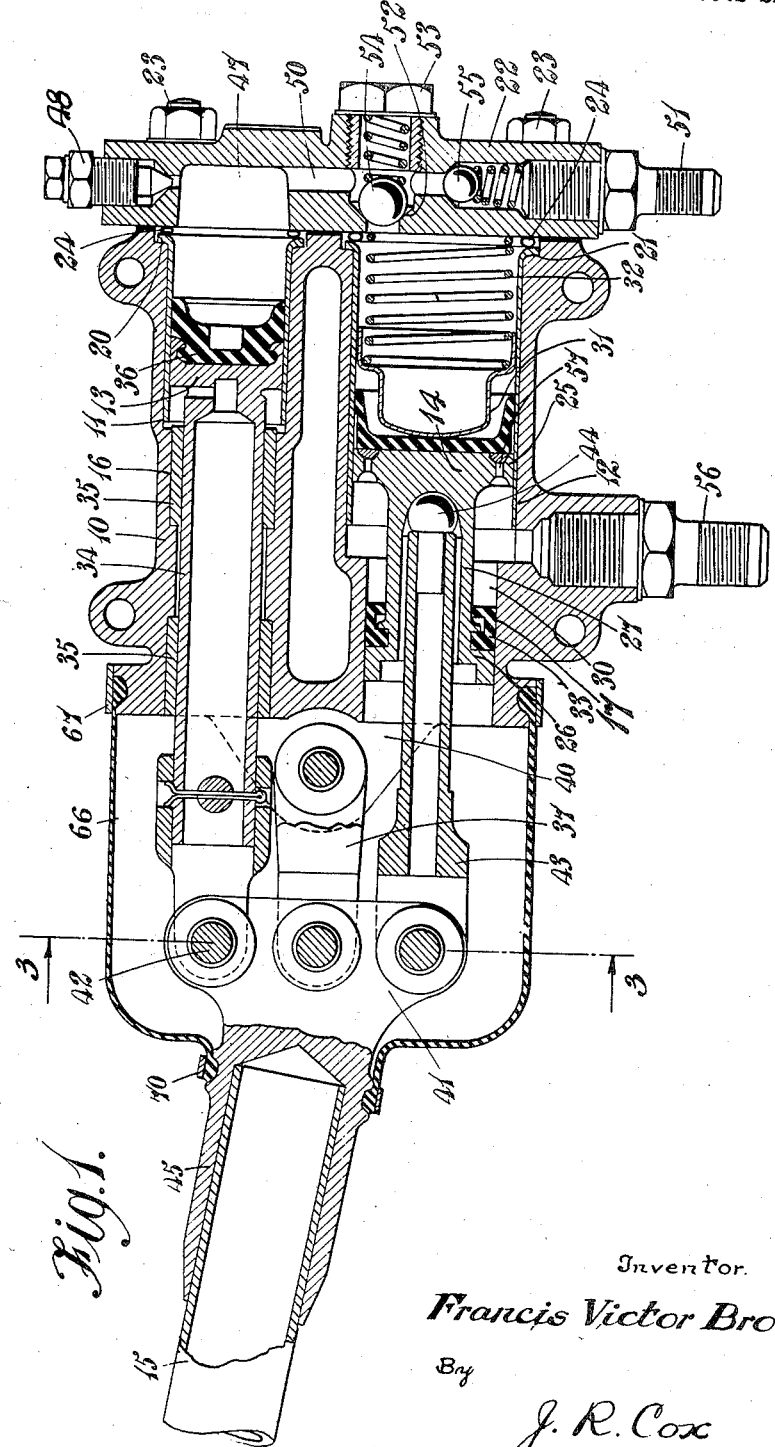

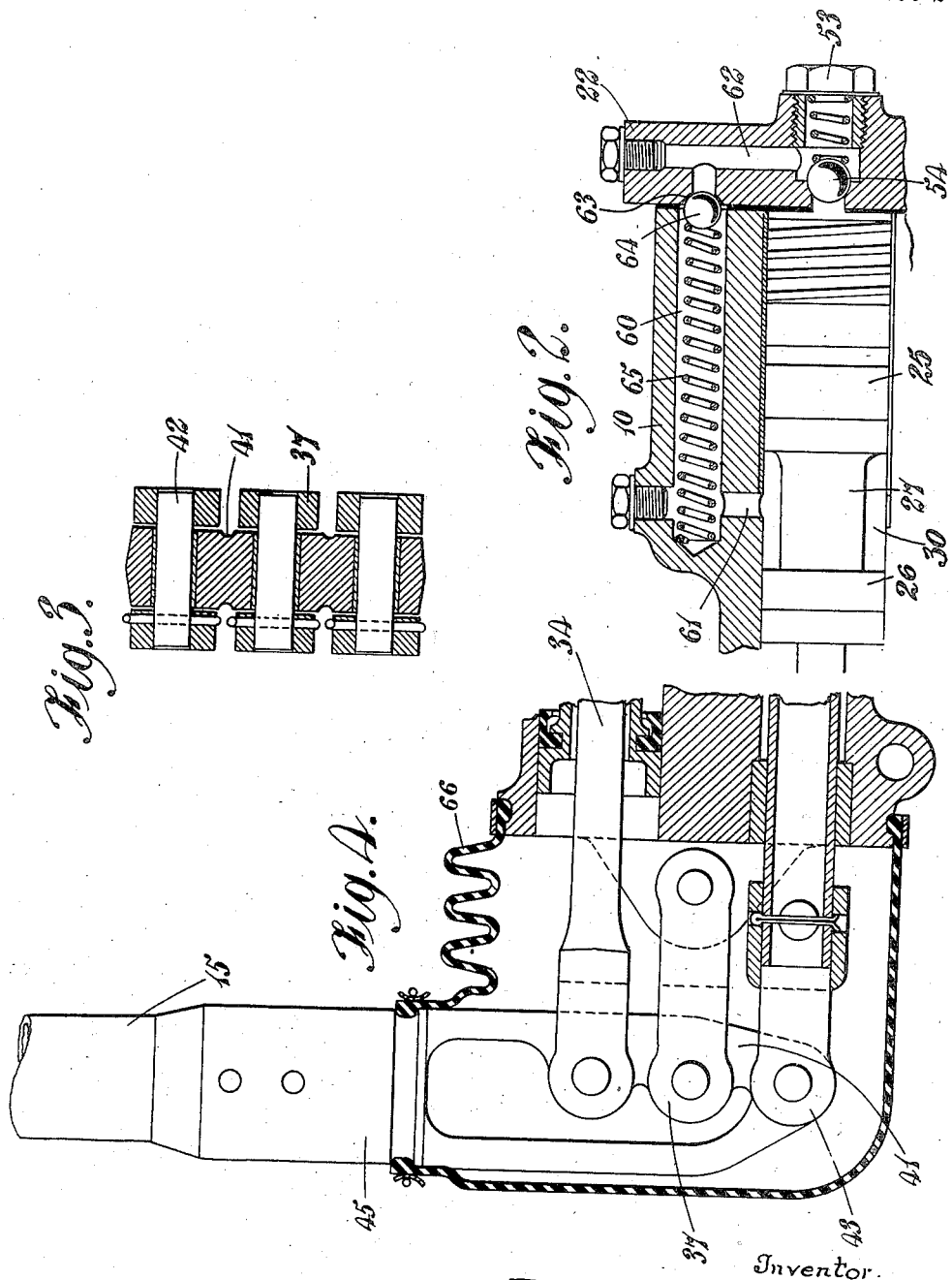

2,205,828

UNITED STATES PATENT OFFICE 2,205,828

PUMP FOR LIQUID PRESSURE REMOTE CONTROL SYSTEMS

Francis Victor Brown, London, England, assignor to Automotive Products Company Limited, London, England Application August 24, 1937, Serial No. 160,700
In Great Britain September 4, 1936

7 Claims. (Cl. 103—168)

This invention relates to pumps for liquid pressure control system, and has for its object to provide a hand-operated pump of simple form and construction which will provide a comparatively steady delivery of liquid. The pump is primarily intended for use as an auxiliary in a liquid pressure control system which is normally operated by a mechanically driven pump, but it is obviously also capable of use as the principal pressure generating unit of a control system.

According to the invention a pump for a liquid pressure control system comprises two cylinders of different diameters, the pistons in which are reciprocable in opposite senses by a handle or lever, the larger cylinder being arranged to receive liquid from a reservoir, and the smaller cylinder to receive a part of the liquid delivered by the larger cylinder and force it into the pipeline during the suction stroke of the larger piston, whereby a substantially continuous delivery of liquid to the pipeline is maintained.

According to one feature of the invention, the operating handle is connected to the pump pistons by means of a yoke connected centrally to the pump body by means of a pivoted link, the yoke being connected at one end to the rod of one of the pump pistons, and at the other to a thrust rod operating the second piston.

A pump embodying the invention will now be described with reference to the accompanying drawings in which:

Figure 1 is a longitudinal section through the body of the pump;

Figure 2 is a fragmentary longitudinal section of the pump, showing a blow-off passage connecting the outlet and inlet.

Figure 3 is a transverse section on the line 3—3 in Figure 1; and

Figure 4 is a view showing an alternative arrangement of the operating handle.

The pump consists of a body 10 in which are formed the cylinders 11 and 12, pistons 13, 14 in the cylinders, and a handle 15 pivotally mounted on the body 10, by means of which the pistons are reciprocated.

The body of the pump 10 is formed by a casting having two bores 16, 17 extending completely therethrough, the cylinders 11 and 12 being formed by sleeves or liners mounted in one end of each bore. The sleeves of the cylinders 11, 12 have radial flanges 20, 21 resting on shoulders at the outer ends of the bores 16, 17, and the sleeves are clamped in place by an end plate 22 secured to the pump body by studs 23. Suitable sealing members such as gas-filled tubular metal rings 24 are arranged between the flanges of the sleeves and the end plate.

The bores 16 and 17 are both of smaller diameter at their ends remote from the end plate 22. The piston 14 in the bore forming the cylinder of larger diameter has one end 25 of a diameter to fit in the liner of cylinder 12, and the other end 26 of a diameter to fit in the smaller part of the bore, the intermediate portion of the piston being reduced at 27 to form an annular chamber 30. A cup washer 31 cooperates with the end 25 of the piston, being held up against the piston face by a spring 32, and a packing ring 33 around the smaller end of the piston provides a fluid-tight joint between the piston and the reduced end of the bore.

The piston 13 in the smaller cylinder is formed with an integral rod 34 sliding in bearing sleeves 35 mounted in the reduced part of the bore 16, and is packed by a cup washer 36 of the button type.

The operating handle 15 is carried on a link 37 pivotally connected both to the pump casing and the handle. The link is mounted between a pair of ears or lugs 40 on the casing 10, being bifurcated at its other end to embrace a yoke 41 mounted on the end of the handle 15. This yoke 41 lies more or less transverse to the longitudinal axis of the handle 15. The rod 34 of the piston 13 is pivotally connected at 42 to one end of the yoke, and a thrust rod 43 is pivotally attached to the other end. The thrust rod 43 extends into the hollow rear end of the larger piston 14, having a ball end 44 engaging the inner end of the recess in the piston.

The yoke 41 is formed integral with a sleeve 45 into which the operating handle 15 is fitted.

The end plate 22 carries the delivery passages of the pump. It has on its inner face a cylindrical recess 47 which registers with the smaller pump cylinder 11, and a passage 50 leads from this recess 47 across the end of the larger cylinder 12 to an outlet 51. A cross-bore 52, closed at its outer end by a cap 53 connects the larger cylinder 12 to the passage 50, a spring-controlled non-return valve 54 being provided to prevent the return of liquid from the passage 50 to the cylinder 12. A screw plug 48 mounted in the end plate 22 closes an aperture leading to the recess 47, this plug being opened for removing air from the pump by the process known as bleeding. A second non-return valve 55 in the passage 50 prevents the return of liquid from the pipeline to the pump.

The pump has an inlet connection at 56 for connection to a liquid supply, this inlet feeding liquid to the annular space 30 around the central part of the piston 14, from which space the liquid passes to the front of the piston on the suction stroke by way of holes 57 in the piston, the cup collapsing to permit the liquid to pass.

A passage 60 may be formed in the pump casing (see Figure 2), connecting the outlet passage 50 and the space 30. The passage 60 opens at each end into a cross passage 61, 62. A seat 63 is formed on the end plate 22 where the bore 60 enters, and a ball 64 pressed against this seat by a spring 65 in the bore 60 forms a blow-off valve, connecting the two sides of the pump when the pressure rises sufficiently to overcome the spring 65.

A boot 66 suitably clamped at 67 and 70 to the pump casing 10 and the handle 15 protects the operating mechanism and the rear end of the pump cylinders from the ingress of dust and other foreign matter.

An alternative arrangement of the pump-operating handle is shown in Figure 4, the operating rods 34 and 43 being in this case coupled to the handle 15 on a line lying substantially lengthwise of the handle, so that the latter projects in a direction transverse to the axis of the pump cylinders. The pump operates in the following manner.

As the handle 15 is moved in one direction, (clockwise in Figure 1) it pulls back the thrust rod 43 allowing the piston 14 to move along the cylinder 12 under the influence of the spring 32, the piston cup 31 collapsing and allowing liquid to pass into the working portion of the cylinder.

On the return stroke of the handle the thrust rod 43 forces the piston forward, and the liquid is expelled from the cylinder past the valve 54.

During the stroke the piston 13 in the cylinder 11 is moving away from the end plate 22, and the space therein is increasing. A part of the liquid expelled by the piston 14 therefore passes into this cylinder, but, owing to the greater diameter of the cylinder 12 more liquid is expelled than can be accommodated in the cylinder 11 and the remainder passes the valve 55 and enters the pipeline.

On again reversing the direction of movement of the handle 15, the liquid in the cylinder 11 is forced out, and passes the valve 55 into the pipeline, being unable to return to the cylinder 12 because of the valve 54. During this operation the cylinder 12 is receiving a fresh supply of liquid from the space 30.

The pump thus delivers liquid to the pipeline at every stroke of the handle, but by reason of its construction has only one inlet connection, thus greatly simplifying its construction and the process of connecting it in a liquid pressure control system.

The inlet of the pump must of course be connected to a suitable reservoir from which it is kept supplied with liquid, for example by gravity, and the outlet is connected to the cylinder or cylinders to be controlled, some form of control valve being interposed if the system is double acting, for reversing the direction in which the piston of the slave cylinder is operated.

The pump is particularly suitable, by reason of its lightness and compact construction, for use in liquid pressure control systems employed on aircraft for the operation of the jacks controlling retractable undercarriages, flaps, bomb release gear and like devices. In such an application the pump will be connected to a control valve for directing the liquid delivered to whichever controlled system is to be operated.

What I claim is:

1. A pump for a liquid pressure control system, comprising a body, two cylinders of different diameters, formed in said body, pistons in said cylinders, a space formed in the larger piston, a liquid supply connected to said space, a valve on the larger piston through which liquid is admitted from said space through said piston upon the suction stroke of the latter, yielding means loading said larger piston, a handle, means connecting the pistons to the handle to move the pistons in opposite directions, said means including a positive connection with the smaller piston and a one-way connection with the larger piston, a passage leading from the larger cylinder to the smaller cylinder and a delivery line, means interposed in said passage to prevent the liquid as it leaves the smaller cylinder from being returned to the larger cylinder, whereby said liquid is fed to the delivery line during the suction stroke of the larger piston.

2. A pump for a liquid pressure control system, comprising a body, two cylinders of different diameters formed in said body, pistons in said cylinders, an annular space in the larger piston, a liquid supply connected to said space, a valve on the larger piston through which liquid is admitted from said space through the said piston upon the suction stroke of the latter, a handle, means connecting said pistons to said handle whereby movement of said handle moves said pistons in opposite directions, a passage leading from the larger cylinder to the smaller cylinder and a delivery line, a valve in said passage preventing the liquid as it leaves the smaller cylinder from being returned to the larger cylinder, a connection between said passage and the annular space in the larger piston, and a non-return blow off valve in said connection adapted to lift when the pressure created by the pump exceeds a predetermined value.

3. A pump for a liquid pressure control system, comprising a body, two cylinders of different diameters formed in said body, a passage in said body for fluid flow from the larger of said cylinders to the smaller, pistons in said cylinders, yielding means loading said larger piston, a handle, means connecting the pistons to the handle to move the pistons in opposite directions, whereby fluid is caused to flow in said passage, said means including a positive connection with the smaller piston and a one-way connection with the larger piston, and means for opposing a sudden movement of said larger piston in the non-pumping direction of travel, said means including an annular pressure fluid receiving space on the side of said larger piston opposite to the side receiving said yielding means, and fluid by-pass means connecting with said annular space to augment the pressure therein, whereby said larger piston is prevented from following up a sudden shifting of the handle and one-way connection at a rate sufficiently rapid to produce a vacuum on the side of said piston remote from said annular space.

4. A pump for a liquid pressure control system, comprising a body, two cylinders of different diameters formed in said body, a passage in said body for fluid flow from the larger of said cylinders to the smaller, a chamber in the body coaxial with the larger cylinder and having a diameter smaller than that of the larger cylinder, a piston mounted in the smaller cylinder, a piston having one head mounted in the larger cylinder and another head mounted in said chamber, means connecting the pistons and operative to move said pistons in opposite directions, whereby fluid is caused to flow in said passage, and means for opposing a sudden movement of said last-named position in one direction of travel, said means including an annular space between the two piston heads, a liquid supply connected to said annular space, and a valve on the larger piston head through which liquid is admitted from said space into the larger cylinder.

5. A pump for a liquid pressure control system, comprising a body, two cylinders of different diameters formed in said body, a chamber in the body coaxial with the larger cylinder and having a diameter smaller than that of the larger cylinder, a piston mounted in the smaller cylinder, a piston having one head mounted in the larger cylinder and another head mounted in said chamber, means connecting the pistons and operative to move said pistons in opposite directions, a member connecting the two piston heads to form a differential bore annular space in the body, a liquid supply connected to said annular space, a valve on the larger piston head through which liquid is admitted from the space into the larger cylinder, a passage connecting the larger cylinder to the smaller cylinder and to a delivery line, a valve in the passage preventing liquid forced into the smaller cylinder from being returned to the larger cylinder, and a second valve in said passage preventing liquid from being drawn from the delivery line into the smaller cylinder.

6. A pump for a liquid pressure control system, comprising a body, two cylinders of different diameters formed in said body, a chamber in the body coaxial with the larger cylinder and having a diameter smaller than that of the larger cylinder, a piston mounted in the smaller cylinder, a piston having one head mounted in the larger cylinder and another head mounted in said chamber, an annular space between the two piston heads, a liquid supply connected to said space, a valve on the larger piston head through which liquid is admitted from said space into the larger cylinder, yielding means within the larger cylinder and taking support on the piston head mounted in said cylinder, a handle, means connecting the pistons to the handle to move the pistons in opposite directions, said means including a positive connection with the smaller piston and a one-way connection with the larger piston, a passage leading from the larger cylinder to the smaller cylinder and a delivery line, and a valve in said passage preventing liquid forced into the smaller cylinder from being returned to the larger cylinder.

7. A pump for a liquid pressure control system, comprising a body, two cylinders of different diameters formed in said body, a piston mounted in the smaller cylinder, a chamber in the body coaxial with the larger cylinder and having a diameter smaller than that of the larger cylinder, a piston having one head mounted in the larger cylinder and another head mounted in said chamber, a member connecting the two piston heads to form a differential bore annular space in the body, a liquid supply connected to said annular space, a valve on the larger piston head through which liquid is admitted from said space into the larger cylinder, a handle, a positive connection between the handle and the piston mounted in the smaller cylinder, a one-way connection between said handle and the piston mounted in the larger cylinder, yielding means within the larger cylinder taking support on the piston head mounted in said cylinder, a passage leading from the larger cylinder to the smaller cylinder and a delivery line, a valve in said passage preventing the liquid which leaves the smaller cylinder from being returned to the larger cylinder, a connection between said passage and said annular space and a non-return blow off valve in said connection adapted to lift when the pressure created by the pump exceeds a predetermined value.

FRANCIS VICTOR BROWN.